3,225,087
PROCESS FOR PRODUCTION OF SODIUM 2,3,6-TRICHLOROPHENYLACETATE
Edwin Dorfman, Grand Island, Edward D. Weil, Lewiston, and Jack S. Newcomer, Wilson, N.Y., assignors to Hooker Chemical Corporation, Niagara Falls, N.Y., a corporation of New York
No Drawing. Filed Mar. 21, 1960, Ser. No. 16,115
7 Claims. (Cl. 260—515)

This invention relates to a process for the production of a herbicide. More specifically, the concept of this invention resides in a novel process for the production of sodium 2,3,6-trichlorophenylacetate. This application is a continuation-in-part of Ser. No. 692,046, filed in the United States Patent Office on October 24, 1957, now abandoned. Disclosed in this parent application and co-pending application Ser. No. 730,051, filed April 22, 1958, now abandoned, are various derivatives of 2,3,6-trichlorophenylacetic acid including the salts.

The process of this invention briefly comprises chlorination of toluene in the presence of a catalyst until about two to three chlorine atoms are introduced per mole of toluene. The trichlorotoluene fraction is separated out and further chlorinated in the side chain until from about 0.3 to 1.0 chlorine atoms are introduced. The resulting product is then treated with an alkali cyanide and hydrolyzed with a selected reagent. The pH of the hydrolysis product is then adjusted essentially to neutrality, the insoluble portion is separated out and recycled. The resulting aqueous solution is extracted with a water-immiscible organic solvent. This process will be defined in greater detail in the ensuing discussion.

In applications Ser. No. 692,046 and Ser. No. 730,051 above mentioned, the use of the salts of 2,3,6-trichlorophenylacetic acid as soil sterilants is disclosed. The commonly used soil sterilants in use have serious disadvantages, for example, sodium chlorate and sodium borate must be used in large amounts on the order of 1000 pounds per acre. Also, if these commonly used herbicides are to be sprayed as water solutions, many hundreds of gallons of water must be employed per acre. In spraying railway lines for example, this is a serious shortcoming. Sodium chlorate has the further disadvantage of being inflammable when admixed with organic solvents. Sodium arsenite must be used also at high rates to achieve soil sterilization, and is furthermore toxic. Several soil sterilants in recent years have been developed which are usable at low rates, namely, the aryl dialkyl ureas and the bis(alkylamino) chlorotriazines, but these materials are not water soluble and must be used as wettable powder if they are to be sprayed in aqueous medium. Such wettable powders have the inconvenient characteristic that they must be continually agitated to hold them in suspension. A water-soluble herbicide on the other hand has the advantage of not requiring agitation. There has been lacking in the art of soil sterilization a safe, non-toxic, water-soluble, economical herbicide usable at low rates of application and sprayable, without need for agitation in low gallonages of water. Furthermore, the water solution of such a herbicide must not deposit solids on cooling, lest spray nozzles become clogged. The making of a herbicidal composition meeting all these requirements is provided by this invention.

To successfully produce such a herbicide requires the avoidance or reduction in the amount of relatively water-insoluble inert by-products formed. In producing sodium 2,3,6-trichlorophenylacetate the avoidance of the formation of the feebly water-soluble sodium tetrachlorophenylacetates is desirable. This is so because sodium tetrachlorophenylacetates are of little herbicidal value and merely contaminate the sodium 2,3,6-trichlorophenylacetate aqueous formulations. Also the formation of undesirable inerts should be avoided since these inerts precipitate out on cooling and thereby clog the spray nozzles. Another problem faced in manufacturing sodium 2,3,6-trichlorophenylacetate is the avoidance and removal of impurities of non-salt like character which precipitate from the aqueous sodium 2,3,6-trichlorophenylacetate solution on dilution. Further, the minimization of sodium trichlorophenylacetate isomers other than the active 2,3,6-isomer is desirable since these other isomers add to the cost to a degree exceeding their slight herbicidal value. Together with these above difficulties a maximum overall yield of sodium 2,3,6-trichlorophenylacetate is attained by the process of this invention.

The preparation found in the prior art for chlorinated phenylacetonitrile usually comprises chlorination of toluene in the ring to introduce the number of chlorine atoms desired in the final product. It has now been found that this operation is most undesirable if one is to utilize the nitrile for preparation of the sodium salt of the corresponding acid, since to follow this teaching is to obtain a product contaminated with tetrachlorinated by-products which have the undesirable solubility characteristics described above. It has furthermore been unexpectedly found that the ratio of the 2,3,6-trichloro isomer relative to other trichloro isomers is less than optimum by following the prior art teaching. We believe that this is because 2,3,6-trichlorotoluene undergoes more rapid chlorination than do the other isomers, although we do not wish to be held to this hypothesis.

In the first step of the invention, the procedure is to chlorinate toluene or ortho-chlorotoluene at twenty to one hundred degrees centigrade using catalytic amounts (0.01–5% preferred) of at least one catalyst selected from the group consisting of ferric chloride, antimony chloride, aluminum chloride, zinc chloride, iodine, molybdenum chloride, tin chloride, or boron trifluoride, to introduce 2.4–2.8 chlorine atoms per mole, followed by fractionation of the crude product to obtain the trichlorotoluene fraction, the dichlorotoluene fraction being recycled to the chlorination either batchwise or continuously. It should be mentioned here that it is critical to the process of this invention that the introduction of chlorine atoms on the ring not exceed 2.8 chlorine atoms per mole.

The prior art teachings for the preparation of a ring chlorinated benzyl chloride are to chlorinate the corresponding chlorotoluene until one chlorine atom is introduced on the side chain. It has been found that it is advantageous to the purity of the final product of this invention, to chlorinate trichlorotoluene on the side chain to introduce 0.5–0.9 chlorine atom per mole. This chlorination is carried out at eighty to two hundred degrees centigrade, without a catalyst or preferably under illumination by visible ultraviolet light. Again it is critical to this invention that not more than 0.9 chlorine atom be introduced on the side chain. If this prior art process is followed, the resultant ring-chlorinated benzyl chloride is seriously contaminated with by-product benzal chlorides which when carrying through the further steps of this process would result in contaminants in the final product.

The prior art discloses and teaches many examples of the preparation of ring-substituted phenylacetic acids by treatment of the corresponding ring-substituted benzyl chloride with an alkali cyanide in a solvent such as aqueous methyl or ethyl alcohol, to form the corresponding benzyl cyanide (phenylacetonitrile) which is then hydrolyzed to the acid or salt. In all prior art examples, either the benzyl chloride or the resultant benzyl cyanide or both are purified by fractional distillation. This procedure has been found by us to be detrimental to the overall yield of the final product since both the benzyl chlorides and the benzyl cyanides undergo serious resinification and decomposition on distillation. Plugging up of the distilling column and condenser occurs, and it is difficult to maintain vacuum. Also, the distillation of ring-substituted benzyl chloride and cyanide requires costly vacuum distillation equipment, which furthermore must be of corrosion resistant construction.

We have now found that major benefits in increased yield and the use of simpler and less costly equipment result from the use of the crude undistilled side-chain chlorination product in the cyanation step, followed by purification of the cyanation product only by removal of solvent and inorganic salts, followed then by hydrolysis of the crude organic cyanation product using an alkali hydroxide or a strong mineral acid. We have found that the ultimate purification of the product is best done in the following manner:

The crude hydrolysis mixture, in the case of the alkaline hydrolysis, is adjusted to near neutrality (pH 5–10) by addition of either a mineral acid or trichlorophenylacetic acid. In the case of the acid hydrolysis, the reaction mixture is diluted with water and the aqueous layer decanted, thereby removing excess acid and ammonium salts, then the organic acid layer is stirred with aqueous caustic until the organic acid dissolves in the form of its sodium salt, and the resultant solution adjusted to neutrality in the case of the alkaline hydrolysis product. In either case, the final purification is carried out on the aqueous sodium salt solution at a pH near neutrality.

We have found the conditions for the purification to be critical in that the specific gravity of the aqueous solution must be reduced below 1.19 (measured at twenty-five degrees centigrade) followed by extraction by stirring with a solvent chosen from the group consisting of benzene, an alkylbenzene, a chlorobenzene, a chlorinated lower aliphatic hydrocarbon, trichloroethylene, and perchloroethylene, followed by decantation. If the extraction is done at a higher specific gravity, the formulation retains impurities which precipitated on dilution causing plugging of spray equipment.

The solvent layer, now containing trichlorotoluene, a small amount of trichlorobenzyl chloride, and by-product is sent to a stripping still for recovery of the solvent, which is recycled to the extraction, the trichlorotoluene, which is recycled to the second chlorination step, and, optionally the trichlorobenzyl chloride which may be recycled to the cyanation step or discarded since its amount is usually small.

The aqueous layer, now consisting essentially of sodium 2,3,6-trichlorophenylacetate and isomers, is stripped of traces of solvent by warming or application of vaccum, and adjusted to the desired gravity by other further dilution or partial evaporation as needed.

To further illustrate and make clear the differences between our process and the prior art, the following example is given:

A charge consisting of 100 pounds of toluene and 60 pounds of recycled dichlorotoluenes is chlorinated at sixty degrees centigrade until the weight of the charge has increased to 256 pounds. This crude mixture of di- and trichlorotoluene is separated by fractionation and the dicholorotoluene fraction returned to the chlorinator for inclusion in the charge to the next batch. The trichlorotoluene fraction plus 63 pounds of recycled trichlorotoluene is then added to an iron-free vessel fitted with light wells containing mercury vapor lamps, and chlorinated under illumination until the weight of the charge amounts to 260 pounds (this chlorination production, approximating $C_6H_2Cl_3CH_{0.35}Cl_{0.65}$) is refluxed and stirred for three hours with 50 pounds of sodium cyanide, 221 pounds of methanol, and 46 pounds of water. The methanol is then stripped, the aqueous layer decanted, and the organic layer pumped into a refluxing mixture of 208 pounds of water and 380 pounds of sulfuric acid. After one to two hours at reflux, the reactor is cooled, the layers allowed to separate, and the organic acid layer drawn off. After an optional water wash, the organic acid layer (277 pounds) is added to a solution of 22.8 pounds of caustic soda in aproximately 140 pounds of water and adjusted to a pH of 8.5–9.0. Only a part of the organic by-products separate at this point; these are drawn off and sent to a recovery still for recovery of the trichlorobenzyl chloride and trichlorotoluene contained therein.

The aqueous layer is then diluted to a specific gravity below 1.19 (measured at twenty-five degrees centigrade) and extracted with 270 pounds of toluene by agitation followed by decantation. The toluene extracts are sent to a recovery still for recovery of toluene. The extracted aqueous layer is heated to reflux to remove any residual toluene, then adjusted by dilution or partial evaporation to the desired specific gravity. Any desired formulation adjuvants, such as sequestering agents, anti-foam agents, and wetting agents are added at this stage.

The finished product is a clear aqueous solution of sodium 2,3,6-trichlorophenylacetate accompanied only by other sodium trichlorophenylacetate isomers, being free of sodium tetrachlorophenylacetates and having no tendency to deposit gums, solids, or oils on dilution or chilling above the freeze point. At a commercially-practicable concentration of 1.5 pounds per gallon of equivalent 2,3,6-trichlorophenylacetate, the sodium salt solution as made by our process does not deposit crystals unless chilled below ten degrees centigrade.

Various modifications and changes of our process will be obvious to those skilled in the art and it is our intention to cover those which do not depart from the spirit and scope of the invention.

We claim:

1. A process for the production of sodium 2,3,6-trichlorophenylacetate which comprises chlorinating toluene to a total of 2.4 to 2.8 chlorine atoms on the ring in the presence of a catalytic amount of a catalyst selected from the group consisting of ferric chloride, antimony chloride, aluminum chloride, zinc chloride, iodine, tin chloride, boron trifluoride and molybdenum chloride, separating by fractional distillation a trichlorotoluene fraction, chlorinating this trichlorotoluene fraction on the side chain to a total of 0.5 to 0.9 chlorine atom, treating the resulting product with an alkali cyanide, hydrolysing the resulting product with a material selected from the group consisting of an alkali hydroxide and a mineral acid, and where mineral acid is so employed, diluting the hydrolysis reaction mixture with water, separating the aqueous layer resulting from the organic acid layer, mixing the organic acid layer with caustic soda until the organic acid is dissolved, bringing the hydrolysis product into aqeous solution at a pH of near neturality and diluting with water to a specific gravity of less than 1.19 (measured at 25 degrees centigrade) and extracting and removing impurities from the resultant aqueous solution of sodium 2,3,6-trichlorophenylacetate product with a water-immiscible organic solvent selected from the group consisting of benzene, an alkylbenzene, a chlorobenzene, a chlorinated lower aliphatic hydrocarbon, trichloroethylene and perchloroethylene.

2. A process for the production of sodium 2,3,6-trichlorophenylacetate which comprises chlorinating toluene to a total of 2.4 to 2.8 chlorine atoms on the ring in the presence of a catalytic amount of a catalyst selected from the group consisting of ferric chloride, antimony chloride, aluminum chloride, zinc chloride, iodine, tin chloride, boron trifluoride, and molybdenum chloride, separating the trichlorotoluene fraction by fractional distillation, chlorinating said fraction on the side chain to a total of 0.5 to 0.9 chlorine atom, treating the resulting product with an alkali cyanide, hydrolyzing the resultant product with an alkali hydroxide, bringing the hydrolysis product into aqueous solution at a pH of near neutrality and diluting with water to a specific gravity of less than 1.19 (measured at 25 degrees centigrade) and extracting and removing impurities from the resultant aqueous solution of sodium 2,3,6-trichlorophenylacetate product with toluene.

3. The process of claim 1 wherein the hydrolysis is carried out with mineral acid after which the hydrolysis product is brought to a pH of near neutrality by treatment thereof with sodium hydroxide and the final extraction of imprities from the aqueous solution of sodium 2,3,6-trichlorophenylacetate is made using toluene as the water immiscible extractant.

4. The process of claim 2 wherein the product from the side chain chlorination product is treated with an alkali cyanide, hydrolyzed with mineral acid to the 2,3,6-trichloropenylacetic acid, diluted with water, decanted off from the water containing impurities, stirred with sufficient aqueous caustic to form the sodium salt of 2,3,6-trichlorophenylacetic acid and the resultant sodium 2,3,6-trichlorophenylacetate solution adjusted to a pH of near neutrality and the above sodium salt recovered by evaporation.

5. In a process for preparing 2,3,6-trichlorobenzyl chloride suitable for use as an intermediate for manufacturing crude sodium 2,3,6-trichlorophenylacetate, the critical steps comprising chlorinating toluene in the aromatic ring in the presence of a catalytic amount of a catalyst selected from the group consisting of ferric chloride, antimony chloride, aluminum chloride, zinc chloride, iodine, tin chloride, boron trifluoride and molybdenum chloride until 2.4–2.8 chlorine atoms are substituted on the aromatic ring, separating the trichlorotoluene formed, and chlorinating the separated trichlorotoluene until 0.5–0.9 chlorine atom are introduced into the side chain of the trichlorotoluene.

6. In a process for preparing sodium 2,3,6-trichlorophenylacetate by the chlorination of the aromatic ring of toluene, followed by chlorinating the side chain of the trichlorotoluene formed and reacting the side chain chlorinated trichlorotoluene with an alkali cyanide and hydrolysing the trichlorobenzyl cyanide, the critical step comprising bringing the hydrolyzed trichlorobenzyl cyanide solution into aqueous solution at a pH of near neutrality and diluting with water to a specific gravity of less than 1.19 measured at 25 degrees centigrade, and extracting with a water-immiscible organic solvent selected from the group consisting of benzene, an alkylbenzene, a chlorobenzene, a chlorinated lower aliphatic hydrocarbon, trichloroethylene and perchloroethylene.

7. In a process for preparing purified aqueous solutions of sodium 2,3,6-trichlorophenylacetate by way of the hydrolysis of 2,3,6-trichlorobenzylcyanide, the critical steps comprising bringing the hydolysis product into aqueous solution at a pH of near neturality and diluting said aqeous solution to a specific gravity of less than 1.19 (measured at 25 degrees centigrade), and removing impurities from the resultant aqueous solution of 2,3,6-trichlorophenylacetate product with a water-immiscible organic solvent selected from the group consisting of benzene, an alkylbenzene, a chlorobenzene, a chlorinated lower aliphatic hydrocarbon, trichloroethylene and perchloroethylene.

References Cited by the Examiner

UNITED STATES PATENTS

| | | | |
|---|---|---|---|
| 2,370,394 | 2/1945 | Cass | 260—515 |
| 2,542,216 | 2/1951 | Somogyi | 260—651 |
| 2,790,819 | 4/1957 | Godfrey | 260—651 X |
| 2,844,635 | 7/1958 | Mayor | 260—515 |
| 2,890,243 | 6/1959 | Brown et al. | 260—515 |
| 2,926,201 | 2/1960 | Dreisbach et al. | 260—651 |
| 2,977,212 | 3/1961 | Tischler | 260—515 X |
| 2,980,732 | 4/1961 | Girad et al. | |

FOREIGN PATENTS 573,377  11/1945  Great Britain.

OTHER REFERENCES

Brimelow et al.: J. Chem. Soc. (1951), pages 1208–1212.

Chiavarelli: Gazz. Chim. Ital., vol. 85, pages 1405–1410 (1955).

LORRAINE A. WEINBERGER, *Primary Examiner.*

CHARLES B. PARKER, LEON ZITVER, *Examiners.*